United States Patent [19]
Peng

[11] Patent Number: 5,726,433
[45] Date of Patent: Mar. 10, 1998

[54] OPTICAL SCANNING APPARATUS FOR GENERATING A HELICAL SCANNING PATTERN ON AN EXTERNAL (CYLINDRICAL) SURFACE

[75] Inventor: Ke-Ou Peng, Delft, Netherlands

[73] Assignee: Opticon Sensors Europe B.V., Hoofddorp, Netherlands

[21] Appl. No.: 655,566

[22] Filed: May 30, 1996

[30] Foreign Application Priority Data

May 30, 1995 [EP] European Pat. Off. ............. 95201405

[51] Int. Cl.$^6$ ................................................. G06K 7/10
[52] U.S. Cl. ........................ 235/467; 235/464; 235/472
[58] Field of Search ................................ 235/464, 467, 235/472

[56] References Cited

U.S. PATENT DOCUMENTS

| | | | |
|---|---|---|---|
| 5,221,832 | 6/1993 | Collins | 235/464 |
| 5,600,120 | 2/1997 | Peng | 235/464 |

FOREIGN PATENT DOCUMENTS

| | | |
|---|---|---|
| 0 028 108 | 5/1981 | European Pat. Off. . |
| 0 492 730 | 7/1992 | European Pat. Off. . |
| 0 653 723 | 5/1995 | European Pat. Off. . |
| 2 255 650 | 11/1992 | United Kingdom . |

*Primary Examiner*—Harold Pitts
*Attorney, Agent, or Firm*—Young & Thompson

[57] ABSTRACT

An optical scanner having at least a light source (1), an internal helical scanning line generator (1, 6, 7) for generating a scanning beam defined by a beam focus which in use follows a helical pattern, beam shape conversion means (9; 11; 12; 15, 15a; 16) for receiving the scanning beam from the internal helical scanning line generator and converting its direction in order to make the scanning beam propagating substantially along a virtual conic or cylindrical surface around a scanning axis (T), and deflection means (10; 14; 15b) for receiving the scanning beam from the beam shape conversion means (9; 11; 12; 15, 15a; 16) and deflecting it substantially to the scanning axis (T). Such an optical scanner is particularly suited for reading bar codes on an external cylindrical surface, e.g. on a bottle.

15 Claims, 9 Drawing Sheets

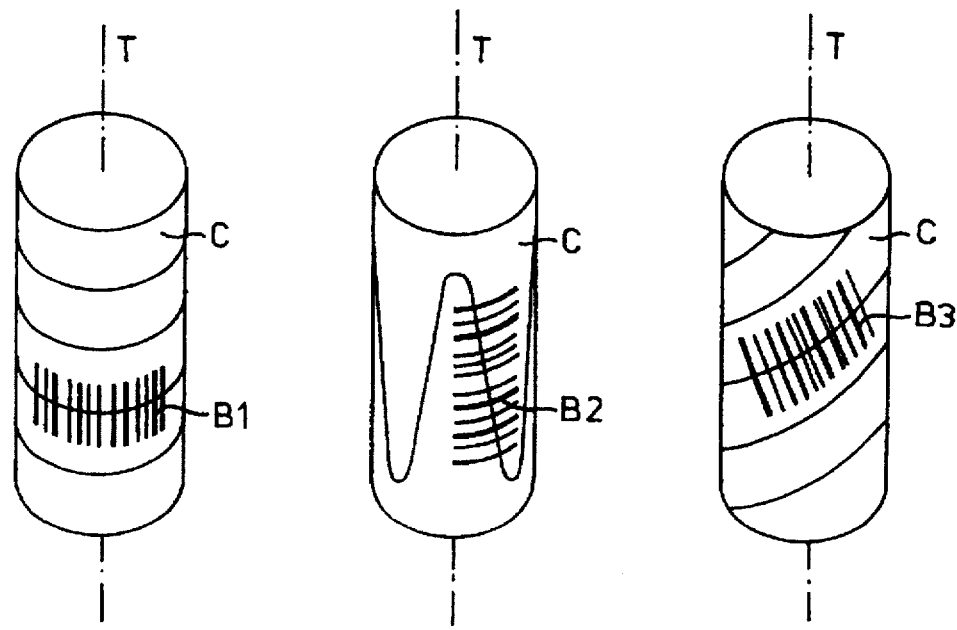
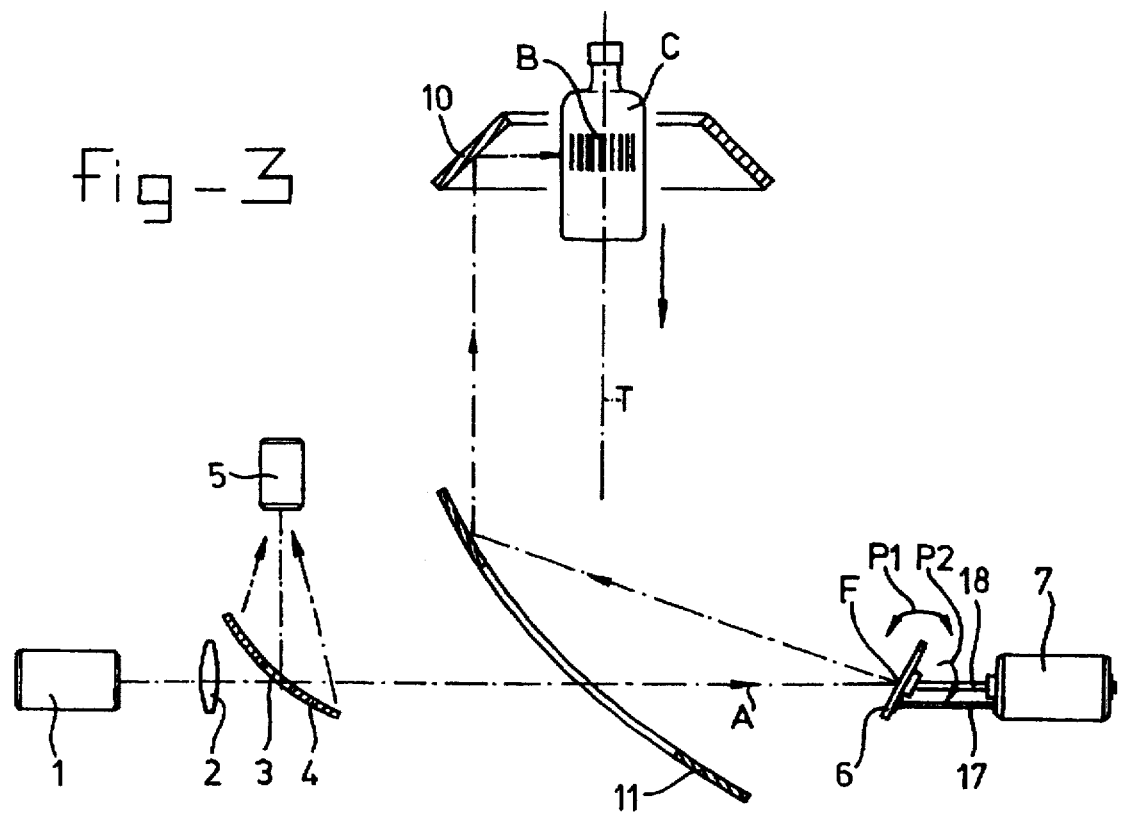

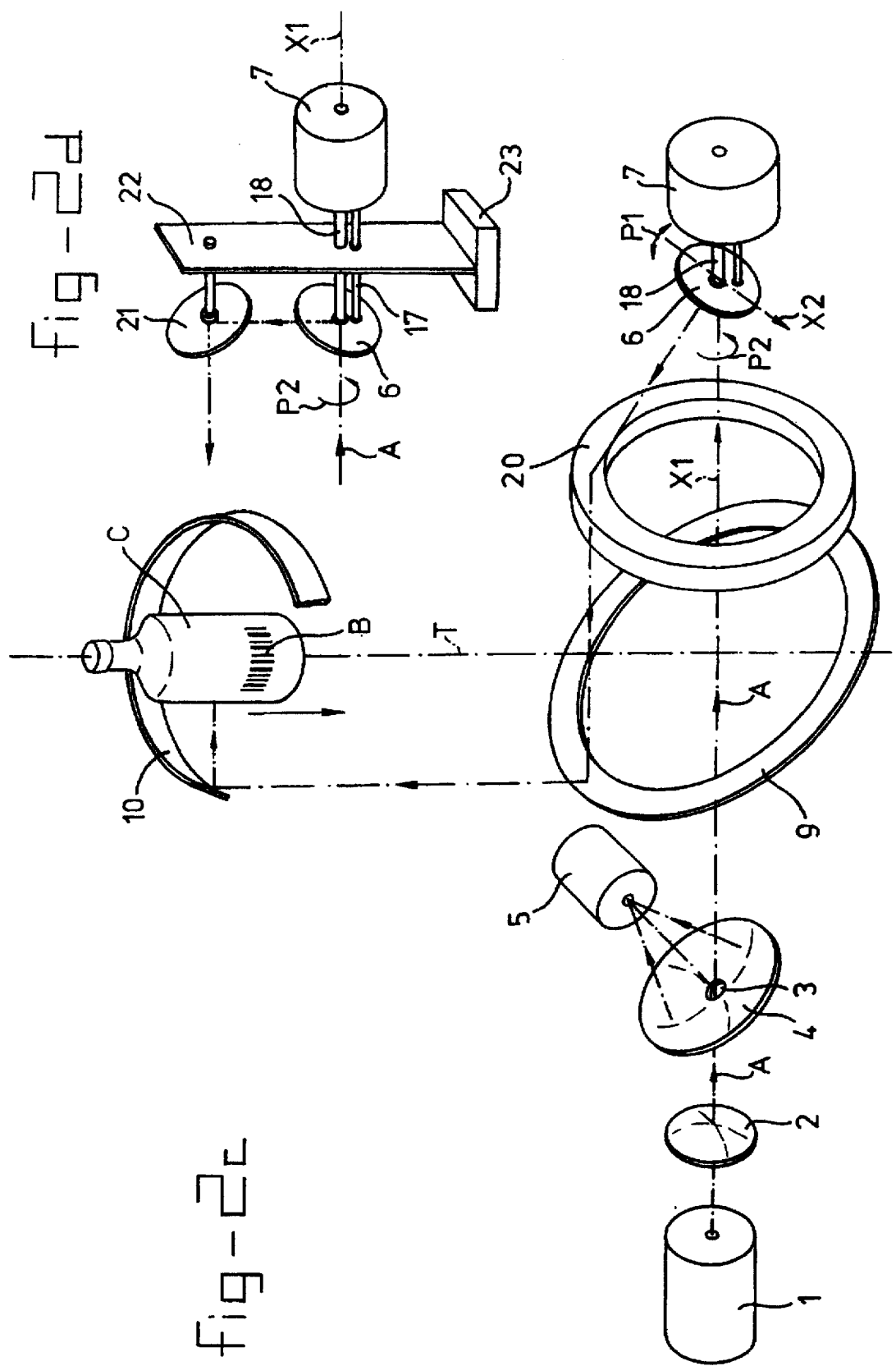

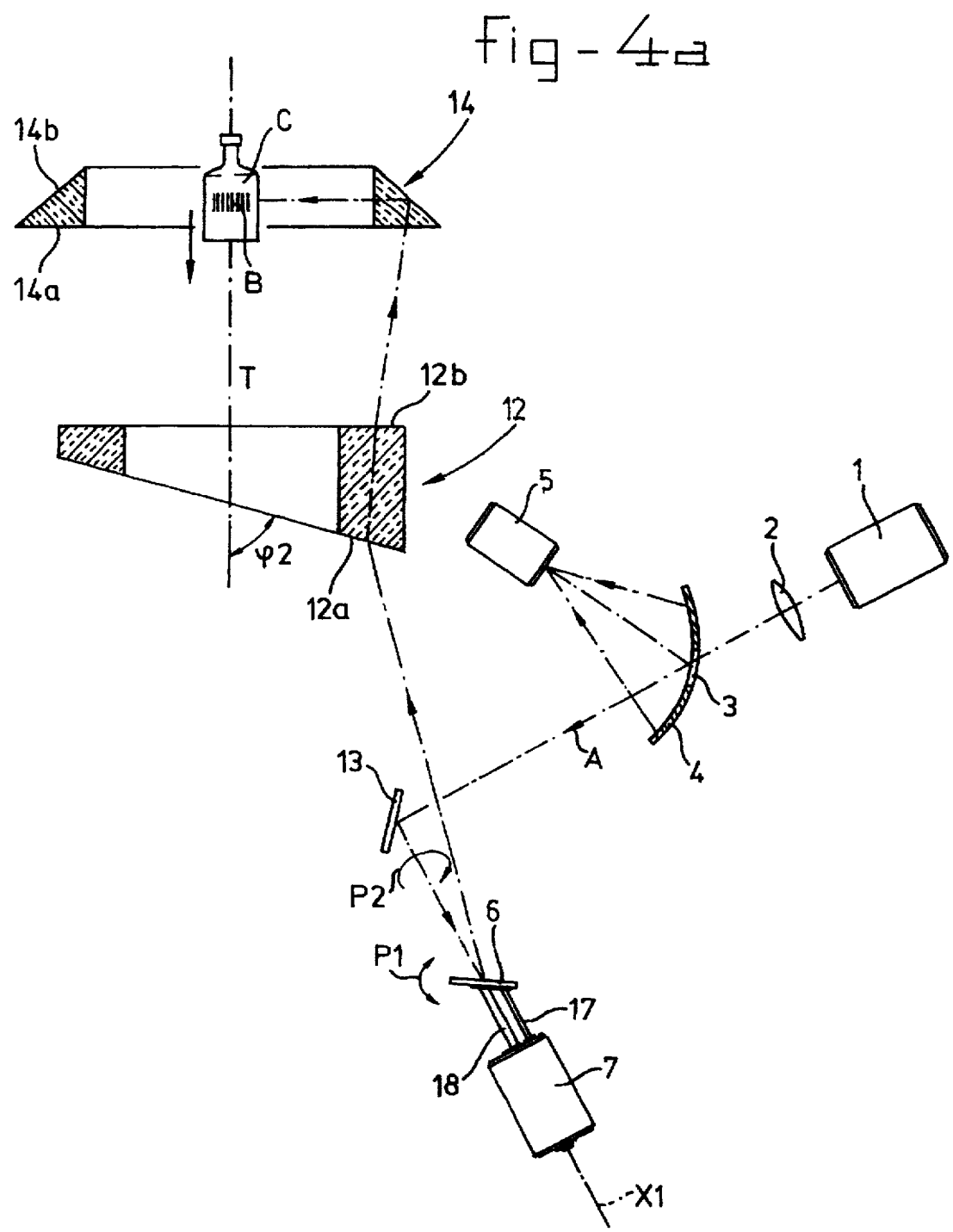

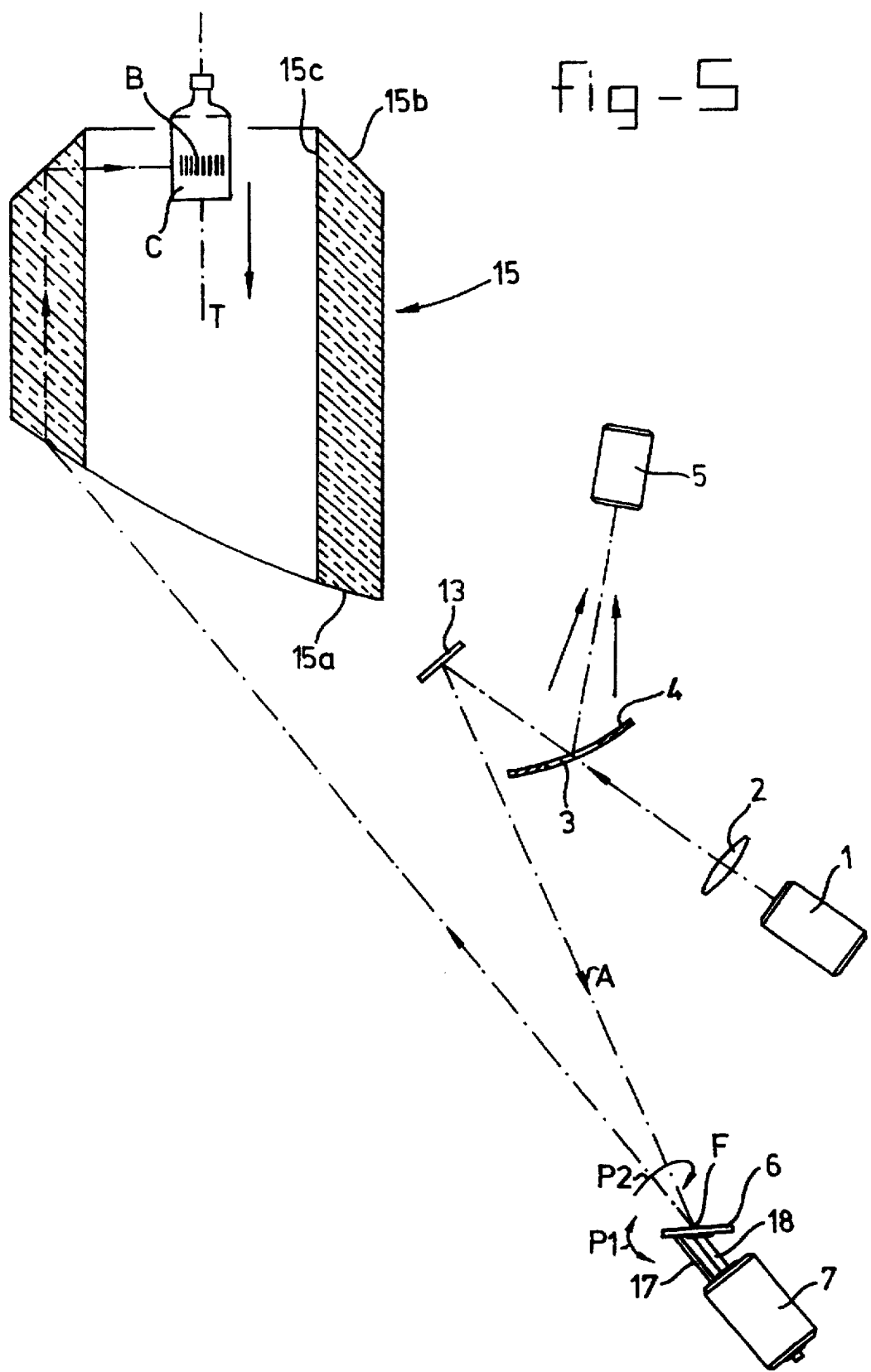

OPTICAL SCANNING APPARATUS FOR GENERATING A HELICAL SCANNING PATTERN ON AN EXTERNAL (CYLINDRICAL) SURFACE

BACKGROUND OF THE INVENTION

The present invention relates to an optical scanner comprising an internal helical scanning line generator for generating a scanning beam defined by a beam focus which in use follows a helical pattern.

Such an optical scanner is known from U.S. Pat. No. 5,600,120. The optical scanner known from the prior art document is able to generate a helical scanning pattern on an internal cylindrical surface. FIGS. 3 through 7 of the above cited patent show different embodiments of an optical scanning apparatus in which a light deflector is able to rotate around a first axis and is able to oscillate around a second axis. Preferably, the first and second axis are normal to one another. The speed of rotation around the first axis and the speed of oscillation around the second axis can be controlled independently. Therefore, the scanning pitch, i.e. the interval between two neighbouring scanning lines of the helical scanning pattern, can be controlled and be adjusted to the specific requirements.

SUMMARY OF THE INVENTION

The object of the present invention is to provide an optical scanner which is able to generate a helical scanning pattern on an external surface of a cylindrical or other body.

The object of the present invention is obtained by an optical scanner which is characterized by beam shape conversion means for receiving the scanning beam from the internal helical scanning line generator and converting its direction in order to make the scanning beam propagating substantially along a virtual conic or cylindrical surface around a scanning axis, and by deflection means for receiving the scanning beam from the beam shape conversion means and deflecting it substantially to the scanning axis.

The optical scanner according to the invention is able to generate a scanning beam "writing" a scanning pattern on an external surface which may be cylindrical and may have a symmetry axis preferably coinciding with the scanning axis to which the scanning beam is directed. In the optical scanner according to the invention, preferably one of the helical scanning pattern generators according to the above cited patent is used since such helical scanning pattern generators, as mentioned above, provide the possibility of a control of the scanning pitch, thus giving a great flexibility as to the orientation of e.g. bar codes on the external surface of a body. Principally, a helical scanning pattern generator with a fixed scanning pitch, e.g. as disclosed by FIG. 10 of British patent application 2,255,650 may be used instead. However, by using such a helical scanning pattern generator no control of the scanning pitch is possible and only bar codes with a predetermined orientation on the external surface of a body can be read accurately.

During use the object (e.g. a bottle) may be in a fixed position or may drop along the scanning axis.

In a first embodiment the beam shape conversion means of the optical scanner comprise a mirror within a plane intersecting the first axis with a predetermined angle of inclination for receiving and deflecting the scanning beam from the internal helical scanning line generator.

In an other embodiment the beam shape conversion means may comprise a parabolic mirror.

In still an other embodiment the beam shape conversion means of the optical scanner may comprise an optical refractive wedge having a receiving surface intersecting the scanning axis with a predetermined angle of inclination and arranged for receiving and deflecting the scanning beam from the internal helical scanning line generator.

Collimator means may be provided between the internal helical scanning pattern generator and the beam shape conversion means. The purpose of applying collimator means is to prevent a large design for the scanner to be able to scan large or long objects: by the application of the collimator means even with a relatively small scanner large and long objects can be scanned.

In a further embodiment, the beam shape conversion means of the optical scanner according to the invention may comprise a lens comprising an optical receiving surface, e.g. a hyperbolic surface, intersecting the scanning axis or a holographic optical deflector intersecting the scanning axis with a predetermined angle of inclination.

In each of the embodiments defined above the deflection means may comprise a ring-shaped mirror around the scanning axis, which may be conic or may have a curved rotationally symmetric shape.

Alternatively, the deflection means of the optical scanner according to the invention may comprise a refraction prism having a receiving surface for receiving the scanning beam from the beam shape conversion means an a deflecting surface for deflecting the scanning beam to the scanning axis, in which the deflecting surface may have a curved, rotationally symmetric shape.

Instead of a separate beam shape conversion means and separate deflection means the beam shape conversion means and the deflection means may be integrally made by a lens comprising a hyperbolic receiving surface intersecting the scanning axis which lens also comprises a deflecting surface for deflecting the scanning beam to the scanning axis.

BRIEF DESCRIPTION OF THE DRAWINGS

The invention will be explained in detail below referring to the annexed drawings in which some embodiments of the present invention are schematically shown.

FIGS. 1a, 1b, and 1c schematically show a cylindrical object having a bar code on its external surface in different orientations.

FIGS. 2a, 2b, 2c, 2d, 3, 4d, 4b, 5 and 6 show different embodiments of the helical scanning pattern generator according to the invention.

DETAILED DESCRIPTION OF THE EMBODIMENTS

In FIG. 1 an object to be scanned, such as a bar code B1, is shown on an external surface of a cylindrical body C, such as a bottle. The external surface of body C is not planar and, moreover, the diameter of the cylindrical surface can vary between large ranges.

Therefore, the depth of field for the optical scanner should be large and a laser scanner is most preferred.

In FIG. 1a the bar code B1 is shown in a substantially circular direction about a scanning axis T.

FIG. 1b shows a bar code B2 in a substantially axial direction, i.e. the bar code B2 is substantially parallel to the scanning axis T.

FIG. 1c shows a bar code B3 in a direction between the circular direction of FIG. 1a and the axial direction of FIG. 1b.

If the bar code is in a circular direction (FIG. 1a) the scanning locus of the scanning beam should meet the following conditions:

1. the scanning locus must be continuous in preferably at least 720°, such that any bar code B1 extending at maximum 360° on the external surface of body C and at any arbitrary position can be read;
2. the scanning pitch, i.e. the interval between two neighbouring scanning lines of the scanning pattern must be less than half the width of the bar code B1 in such a way that at least a part of one full scanning line over a distance of 360° will pass the bar code B1.

If the bar code B2 is in an axial direction (FIG. 1b) the scanning locus should meet the following conditions:

1. in the direction of the scanning axis T the scanning locus must be continuous with at least twice the length of the object such that the bar code B2 at any position along the axis T on the surface of body C can be read;
2. the scanning pitch (see above) must be less than half the width of bar code B2 such that at least one continuous part of the scanning pattern passes the bar code B2.

By varying the scanning pitch a bar code B3 with an arbitrary orientation on the external surface of body C (FIG. 1c) can be read.

To read bar codes on an external surface of a cylindrical body C a continuous helical scanning pattern is preferred.

The scanning speed can be divided into a speed parallel to the scanning axis T and a speed in a circular direction around the axis T. By varying the ratio between the axial speed and the circular speed the actual scanning pattern obtained may have any of the forms shown in FIGS. 1a, 1b, or 1c.

Figure 2A:
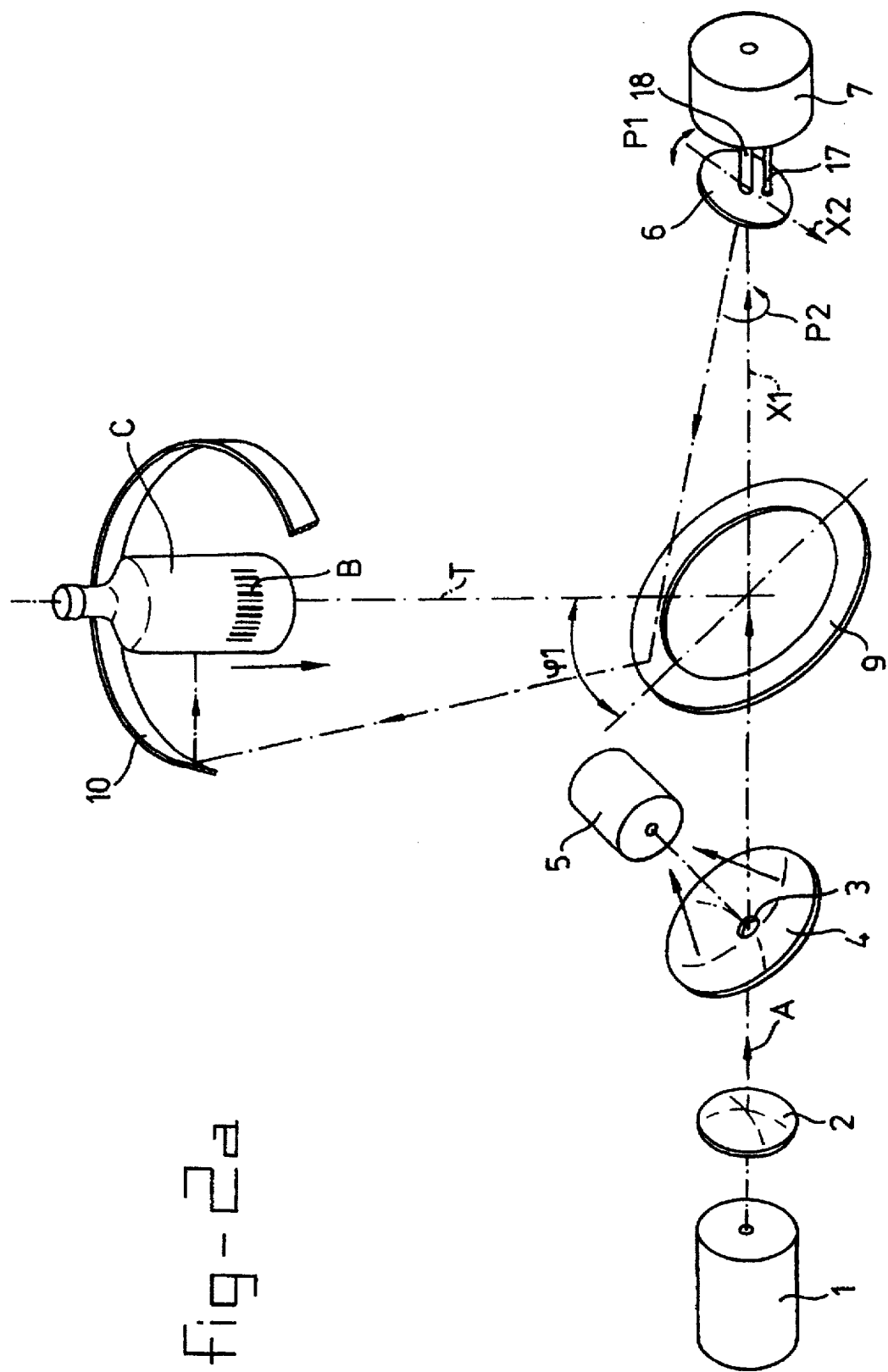

FIG. 2a shows a first embodiment of the optical scanner according to the invention. In this first embodiment the elements used to project the laser beam from a generator of a scanning line to a direction circulating about a scanning axis T are reflective.

Light source 1, which is preferably a laser source, generates a light beam A which is focused by optics 2 to a hole 3 of a light collector 4. The light beam A is directed to a mirror 6. The mirror 6 is part of a helical scanning line generator as described in European patent application 932027345. This helical scanning line generator is, here, only schematically shown and for a detailed description reference is made to the European patent application. The helical scanning line generator comprises, besides the mirror 6, driving means 7 able to rotate mirror 6 by means of a first shaft 18 about a first axis X1. The helical scanning line generator is shown to comprise a second shaft 17 oscillating driven by the drive means 7. By means of the second shaft 17 mirror 6 is made to oscillate in a plane defined by the first axis X1 and a second axis X2 preferably perpendicular to the first axis X1. The direction of rotation is indicated by P2 and the oscillating movement is indicated by P1.

It is noted that the helical scanning line generator indicated by reference numbers 6, 7, 17, and 18 is only schematically illustrated in FIG. 2a. Any of the embodiments of FIGS. 3 through 7 of European patent application 932027345 may be used instead.

Since the light beam A reflected by mirror 6 has a locus following a helical scanning line on an internal surface of a virtual cylindrical (or conic) body, the helical scanning line generator known from the European patent application 932027345 will be referred to as "internal helical scanning line generator".

It is important to note that the rotation P2 and the oscillation P1 can be controlled independently by internal helical scanning line generators according to the European patent application mentioned above. However, principally an internal helical scanning line generator without the capability of independent control of the oscillation and the rotation may be used instead, e.g. an internal helical scanning line generator as shown in British patent application 2,255,650 (FIG. 10).

The light beam A is reflected by mirror 6 to a planar ring-shaped deflector 9. Deflector 9 is situated in a virtual plane intersected by scanning axis T with a predetermined angle φ1. The deflector 9 need not be ring-shaped but only needs to be large enough to receive light beam A reflected by mirror 6. In the arrangement shown in FIG. 2a mirror 9 comprises a hole for passing the object C through the scanner. The main function of mirror 9 is to shape the optical path such that the scanner is allowed to scan large objects like bottles passing through it. When the object is not required to pass the scanner, the mirror 9 can be a disc while, then, components 1, 2, 3, 4, and 5 can be situated at the same side of mirror 9 as mirror 6. Preferably, the light beam A after being reflected by the mirror 9 follows a path of propagation on a virtual cylindrical surface the axis of symmetry of which coincides with scanning axis T and the direction of propagation being parallel to the scanning axis T. However, the path of propagation after the mirror 9 may also be situated on a virtual conic shaped surface the axis of symmetry of which coinciding with the scanning axis T.

After being reflected by mirror 9 the light beam is reflected by a conic ring-shaped mirror 10 which reflects the light beam A to the scanning axis T. The conic surface Of mirror 10 has a predetermined angle of inclination with respect to the scanning axis T. If the light beam A propagates parallel to the scanning axis T before impinging upon the mirror 10 the angle of inclination is preferably 45°.

However, the surface of mirror 10 can also be used to focus the laser beam or correct its aberration. By way of example the surface of mirror 10 may be parabolic or may have any other suitable rotationally symmetric shape.

By varying the rotation speed P2 relative to the oscillation speed P1 of mirror 6 the actual scanning pattern generated on body C can be varied in accordance with the examples shown in FIGS. 1a, 1b, and 1c.

The light beam A impinging upon bar code B on body C is scattered and reflected backwards to the mirrors 10, 9, and 6 to the collector 4 which latter reflects the scattered light to a photosensor 5. The photosensor 5 is connected to evaluating means (not shown) for evaluating the scattered pattern by any method known in the art.

Here, object C is presented to be a bottle. However, object C may have any other shape: it may, for instance, have a conic outer surface or be provided with several (small) planar surfaces. The scanner according to the invention can read bar codes on any surface of such bodies except surfaces normal to the scanning axis T.

Figure 2B:
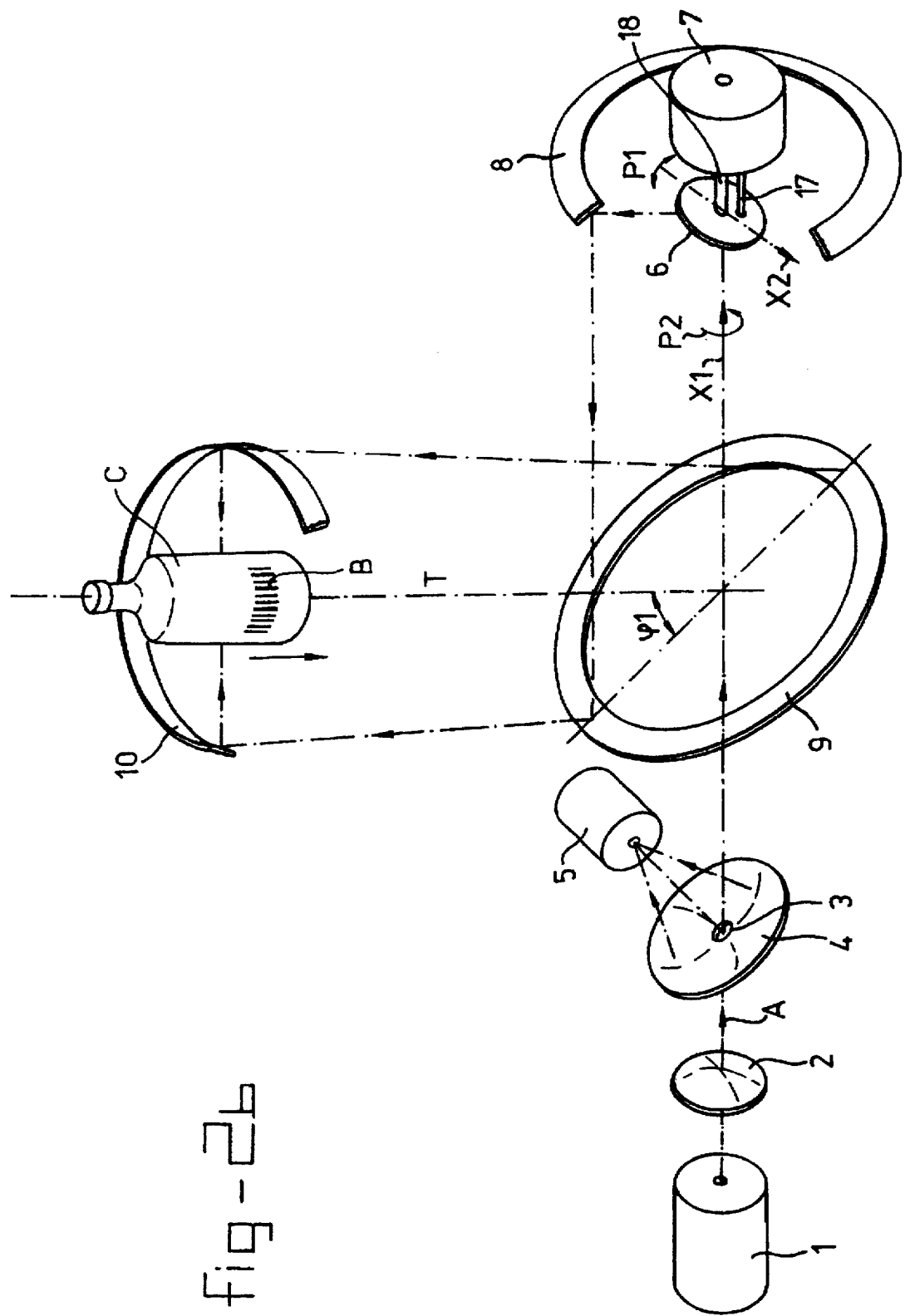

In the embodiment according to FIG. 2b, a conic, ring-shaped mirror 8 surrounding the mirror 6 is used to form a collimated beam parallel to axis X1 and impinging upon deflector 9. The beam reflected by mirror 9 and directed to ring-shaped mirror 10, is, then, also preferably collimated, since then object C can easily "fall" through mirror 10, the collimated beam between mirrors 9 and 10, and mirror 9 without disturbing the collimated beam. Ring-shaped mirror 8 need not be conic. Alternatively, mirror 8 may be curved, e.g. parabolic. As a further alternative, mirror 8 may be replaced by any other suitable collimator means arranged to receive the light beam reflected by mirror 6 and to produce a collimated light beam parallel to axis X1. Such collimated means may e.g. be a ring-shaped lens 20, which may be hyperbolic, as shown in FIG. 2c. A holographic optical element or a Fresnel lens can also be used instead. As a further alternative, ring-shaped mirror 8 may be substituted by a mirror 21 fixed to driving shaft 18 of the mirror 6 through a supporting arm 22, as schematically illustrated in FIG. 2d. In such an arrangement, mirror 21 rotates together with mirror 6. The advantage of the arrangement of FIG. 2d is that it does not introduce aberration as does ring-shaped mirror 8. The additional mass of mirror 21 at the arm 22 may be counterbalanced by a suitable mass 23 at the opposite end of arm 22.

In the embodiment according to FIG. 3 the well known principle is used that light from a source at the focal point of a parabolic reflective surface is parallel to the optical axis of this surface. In the arrangement according to FIG. 3, like in each of the embodiments according to FIGS. 4a through 6, the same reference numbers as in FIG. 1 refer to the same elements and are not explained again. In the embodiment according to FIG. 3 a parabolic mirror 11 is used. The point of reflection on mirror 6 coincides with the focal point F of the parabolic mirror 11. Parabolic mirror 11 reflects light beam A parallel to the scanning axis T to the conic ring-shaped mirror 10 which reflects the light beam A to bar code B on body C.

FIG. 4a shows a third embodiment of the present invention which is less vulnerable for dust and which avoids vulnerability of damage to mirrors 9 or 11. FIG. 4a shows such a third embodiment in which the light beam A passing through the hole 3 of light collector 4 is reflected by a mirror 13 to the rotating and oscillating mirror 6 of the internal helical scanning line generator. The internal helical scanning line generator refracts the light beam A to an optical refractive wedge 12. The refractive wedge 12 comprises a receiving surface 12a and a transmitting surface 12b. Receiving surface 12a is situated in a virtual plane intersected by scanning axis T with a predetermined angle φ 2. The receiving surface 12a receives the light beam A and refracts it in a direction, preferably, parallel to the scanning axis T. When the light beam A is refracted in a direction parallel to the scanning axis T it propagates along a path of propagation along a virtual cylindrical object. However, light beam A may be refracted by receiving surface 12a in such a way that it propagates along a virtual conic-shaped surface.

Instead of the conic mirror 10 of the embodiments shown in FIGS. 2a, 2b, 2c, and 3, in the embodiment according to FIG. 4a a refractive prism 14 is used. The refractive prism 14 comprises a receiving surface 14a and a deflective surface 14b for deflecting the light beam A substantially to the scanning axis T. The refractive wedge 12 and the refractive prism 14 may be, in an alternative embodiment not shown, integrally made in such a way that transmitting surface 12b and receiving surface 14a coincide.

Figure 4B:
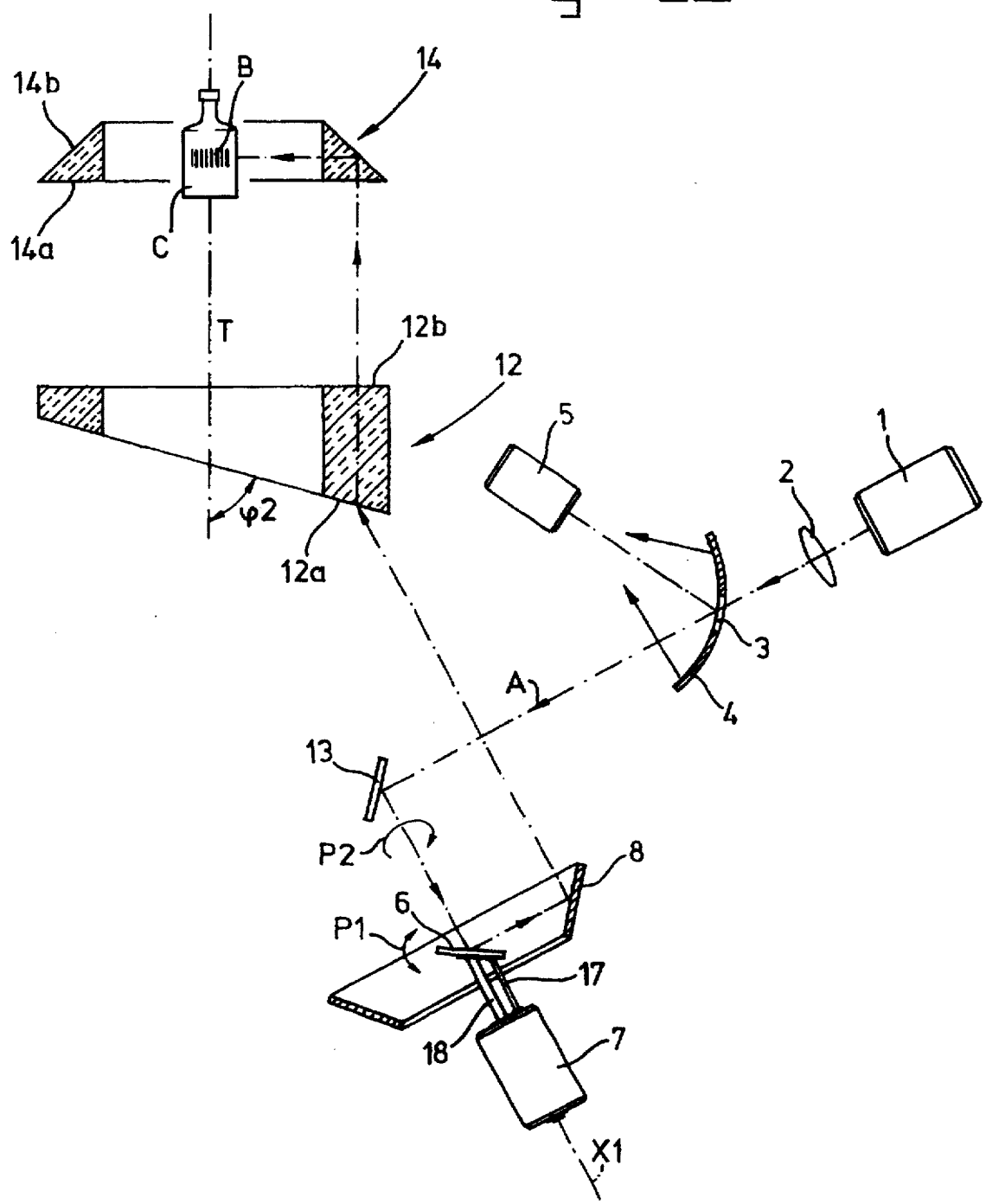

FIG. 4b shows an alternative embodiment of the arrangement according to FIG. 4a. In the embodiment of FIG. 4b a ring-shaped, conic or curved mirror 8 surrounds mirror 6 to collimate light beam A reflected by the latter mirror 6. Like in the arrangements of FIGS. 2a, 2b, and 3 mirror 8 may be replaced by any other suitable collimating means, e.g. a collimating lens like the lens 20 of the FIG. 2c arrangement.

Instead of refractive wedge 12, a holographic optical element or a Fresnel lens could be used.

In the embodiment according to FIG. 5 the well known principle is used that light originating from a source at the focal point of a hyperbolic refractive surface will be refracted by such refractive surface in a direction substantially parallel to the optical axis of this surface. Lens 15 in FIG. 5 is provided with such a hyperbolic refractive surface 15a. The lens 15 is tubular and comprises a deflecting surface 15b opposite to the hyperbolic refractive surface 15a for deflecting light beam A to the scanning axis T.

Of course instead of one lens 15 with a deflecting surface 15b lens 15 may be divided in two parts in which the first part comprises the hyperbolic refractive surface 15a and in which the deflecting surface 15b is part of a refractive prism like refractive prism 14 in the embodiment according to FIG. 4a.

Both in such an embodiment and in the embodiment according to FIG. 4a in which a separate refractive prism 14 is used the prism 14 may be substituted by a conic ring-shaped reflector 10 as shown in FIGS. 2a, 2b, 2c, and 3.

Instead of a hyperbolic refractive surface 15a, other suitable optical means may be used, e.g. a set of spherical lenses, to perform the same function.

Preferably, the point of reflection on mirror 6 in the embodiment according to FIG. 5 coincides with the focal point F of the hyperbolic refractive surface 15a. Then, the light beam A is refracted by the hyperbolic refractive surface 15a substantially parallel to the scanning axis T.

In the optical scanners according to FIGS. 3 and 5, respectively, in which a parabolic reflective mirror 11 and a hyperbolic lens 15, respectively, is used two optical components are combined to be one. However, in this case, the focal spot on the external surface of body C will vary as a function of the scan angle if the ring-shaped deflector 10 is symmetrical relative to the scanning axis T. This results in the difficulty of correcting aberration to decrease the scan spot. This can be avoided by a fifth embodiment according to the invention presented in FIG. 6.

Figure 6:
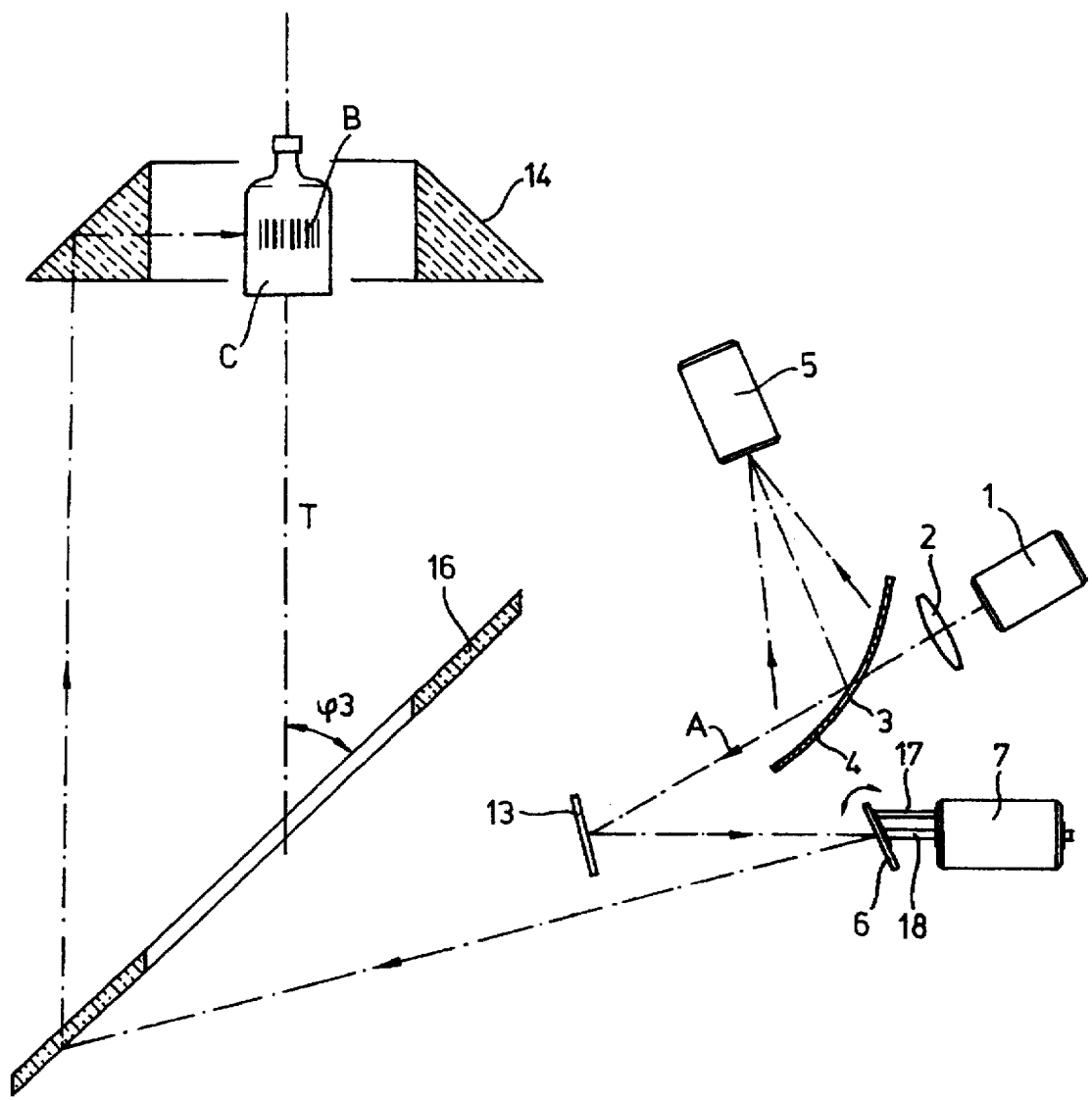

As shown in FIG. 6, instead of a hyperbolic lens 15 a ring-shaped holographic optical deflector 16 tilted a predetermined angle φ 3 relative to scanning axis T, is used. The conic scanning beam A originating from the mirror 6 impinges upon the holographic optical deflector 16. After deflection beam A will be, preferably, parallel to the scanning axis T. A refractive prism 14 deflects light beam A to scanning axis T.

Figure 7:
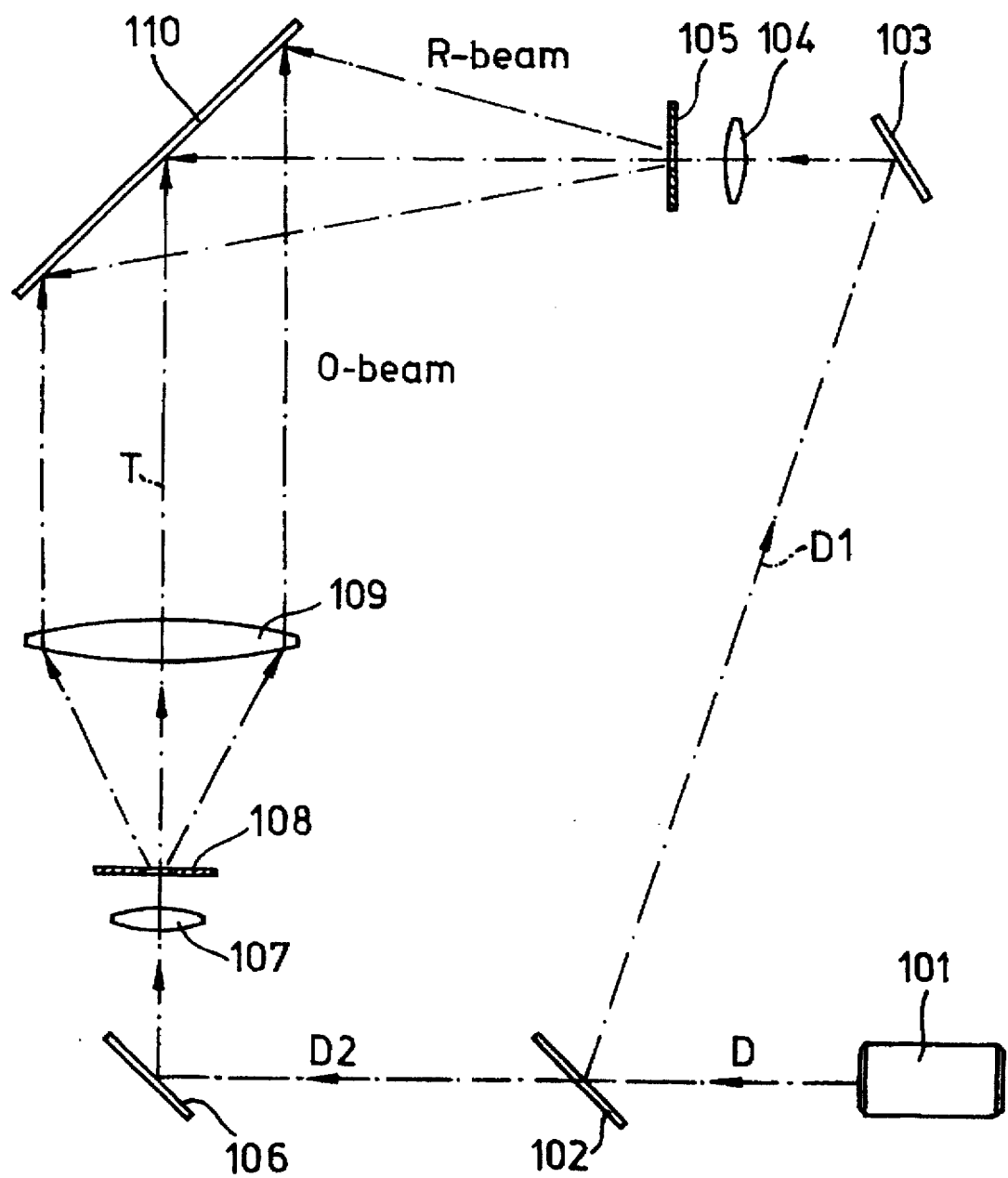
FIG. 7 schematically shows a method to produce a hologram used in the embodiment according to FIG. 6.

FIG. 7 shows one way of producing a holographic optical deflector 16 used in the embodiment of FIG. 6. The wave length of the coherent light used to record the holographic deflector is very close to or preferably equal to the wave length of the light beam A used for scanning in the embodiment according to FIG. 6.

The deflector is recorded by two beams: a reference beam (R-beam) and an object beam (O)-beam). The R-beam has a spherical wave front having a center on or close to the scanning center of the scanner. The O-beam is parallel to the scanning axis T of the scanner. The arrangement for recording the holographic optical deflector using these two beams is shown in FIG. 7.

FIG. 7 shows a source 101 for generating a coherent laser beam D which is split into a first laser beam D1 and a second laser beam D2 by a beam splitter 102. The first laser beam D1 is reflected by a mirror 103 to an optical element 104. After the optical element 104 a spherical R-beam is formed by a pin-hole 105. The pin-hole 105 is located close to the center of rotation of a hologram 110.

The second beam D2 split from the original beam D by beam splitter 102 is reflected by a mirror 106 to an optical element 107 and directed by the optical element 107 to a pin-hole 108. By the pin-hole 108 a diverging beam is produced directed to a further optical element 109 which produces a collimated O-beam. Hologram 110 is then illuminated by both the O-beam and the R-beam. After exposure and processing hologram 110 can be used as a deflector 16. During operation, the point of reflection on mirror 6 in the embodiment of FIG. 6 coincides with the location of pinhole 105, i.e. the point of origin of the R-beam in the arrangement according to FIG. 7.

It is observed that in each of the embodiments shown in FIGS. 2a through 6, as mentioned above, the rotation of mirror 6 indicated by arrow P2 and the oscillation of mirror 6 indicated by arrow P1 are independently controlled. Whenever, in the present patent application, the phrase "internal helical scanning line generator" is used, it is meant to include the possibility that the oscillating movement P1 is extremely slow or even absent. In the latter case the scanning pattern generated on body C will be circular, or in other words the pitch between neighbouring scanning lines equals zero.

Moreover, the deflecting surface 14b of refractive prism 14 in FIGS. 4a and 6 and the deflecting surface 15b of the refractive lens 15 in FIG. 5 may be parabolic or may have any other suitable rotationally symmetrical shape in such a way that light beam A reflected by either surface 14b or 15b is focused to or around the bar code B on object C.

It is observed that when the surface of the mirror 10 in FIGS. 2a, 2b, 2c, and 3, the reflective surface 14b of the refractive prism 14 in FIGS. 4a, 4b, and 6 and the deflective surface 15b in the refractive lens 15 in FIG. 5 is conic, these surfaces have optical focusing power in a circular direction while they do not have any optical focusing power in the radial direction. The light beam incident upon these surfaces will be refocused by them and suffers from aberration. For instance, the parallel light beam along the scanning axis T will be focused by these surfaces in a plane normal to the scanning axis T whereas it will still be parallel in the plane containing this scanning axis T. Therefore, no focal spot occurs. To correct this aberration optical power in a direction of the scanning axis T may be introduced. This object is obtained by making the above-mentioned deflective surfaces curved such that the scanning spot on the outer surface of object C is minimized.

The light beam is assumed to be diverged from a single point at the surface of the rotating and vibrating mirror 6. Using the scanner shown in FIG. 2a a single aberration-free scanning spot can be formed at the scanning axis T if the mirror 10 is provided with a rotationally symmetrical, ellipsoidal surface having a focal point at this point on the scanning axis T and at the diverging point on the rotating and vibrating mirror 6 as imaged by mirror 9.

When the light beam incident upon the mirror 10, the reflective surface 14b or the deflective surface 15b is parallel and in the direction of the scanning axis T an aberration-free scanning spot occurs if the deflecting surface is rotationally symmetrical parabolic.

In the arrangement according to FIGS. 4a, 4b, and 6 alternatively, the receiving surface 14a could also be curved to reduce the size of the scanning spot.

Moreover, for the same purpose, the transmitting surface of the lens 20 (i.e. the left surface in FIG. 2c ) and the transmitting surface 12b in FIGS. 4a and 4b could also be curved.

I claim:

1. An optical scanner comprising an internal helical scanning line generator (1, 6, 7) for generating a scanning beam defined by a beam focus which in use follows a helical pattern, characterized by beam shape conversion means (9; 11; 12; 15, 15a; 16) for receiving said scanning beam from said internal helical scanning line generator and converting its direction in order to make the scanning beam propagating substantially along a virtual conic or cylindrical surface around a scanning axis (T), and by deflection means (10; 14; 15b) for receiving said scanning beam from said beam shape conversion means (9; 11; 12; 15, 15a; 16) and deflecting it substantially to said scanning axis (T).

2. An optical scanner according to claim 1 wherein the beam shape conversion means comprise a mirror (9) within a plane intersecting said scanning axis (T) with a predetermined angle of inclination ($\phi 1$) for receiving and deflecting said scanning beam from said internal helical scanning line generator (1, 6, 7).

3. An optical scanner according to claim 1 wherein the beam shape conversion means comprise a parabolic mirror (11).

4. An optical scanner according to claim 1 wherein the beam shape conversion means comprise an optical refractive wedge (12) having a receiving surface (12a) intersecting said scanning axis (T) with a predetermined angle of inclination ($\phi 2$) and arranged for receiving and deflecting said scanning beam from said internal helical scanning line generator (1, 6, 7).

5. An optical scanner according to claim 1, comprising collimator means (8; 20; 21) arranged to receive said scanning beam from the internal helical scanning line generator (1, 6, 7) and to produce a collimated beam, directed to said beam shape conversion means (9; 12).

6. An optical scanner according to claim 5, wherein said collimator means comprise a ring-shaped mirror (8), which may be conic or rotationally symmetrically curved.

7. An optical scanner according to claim 5, wherein said collimator means are selected to be one of the following group of means: a ring-shaped lens (20), a rotatable mirror (21), a holographic optical element and a Fresnel lens.

8. An optical scanner according to claim 1 wherein the beam shape conversion means comprise a lens (15) comprising an optical receiving surface (15a), e.g. a hyperbolic surface, intersecting said scanning axis (T).

9. An optical scanner according to claim 1 wherein the beam shape conversion means comprise a holographic optical deflector (16) intersecting said scanning axis (T) with a predetermined angle of inclination ($\phi 3$).

10. An optical scanner according to claim 1 wherein said deflection means comprise a ring shaped mirror (10) around said scanning axis (T).

11. An optical scanner according to claim 10 wherein said ring-shaped mirror (10) is conic.

12. An optical scanner according to claim 10 wherein said ring-shaped mirror (10) has a curved, rotationally symmetric shape.

13. An optical scanner according to claim 1 wherein said deflection means comprise a refraction prism (14) having a receiving surface (14a) for receiving said scanning beam from said beam shape conversion means and a deflecting surface (14b) for deflecting said scanning beam to said scanning axis (T).

14. An optical scanner according claim 13 wherein the deflecting surface (14b) has a curved, rotationally symmetric shape.

15. An optical scanner according claim 8 wherein the lens (15) also comprises a deflecting surface (15b) for deflecting said scanning beam to said scanning axis (T).

* * * * *